United States Patent [19]

Stockton

[11] Patent Number: 4,546,353
[45] Date of Patent: Oct. 8, 1985

[54] ASYMMETRIC THRUST WARNING SYSTEM FOR DUAL ENGINE AIRCRAFT

[75] Inventor: William W. Stockton, Cincinnati, Ohio

[73] Assignee: The United States of America as represented by the Secretary of the Air Force, Washington, D.C.

[21] Appl. No.: 577,412

[22] Filed: Feb. 6, 1984

[51] Int. Cl.⁴ .................. G08B 23/00; G08B 21/00; F02K 3/00; G01L 3/26
[52] U.S. Cl. .................. 340/966; 340/945; 340/963; 340/626; 60/39.091; 60/39.15; 60/224; 60/261; 73/117.4; 364/431.01; 364/431.02
[58] Field of Search ............. 340/945, 959, 626, 963, 340/966, 973; 73/117.3, 178 T, 117.4; 364/431.01, 431.02; 60/39.15, 261, 39.091, 223–224

[56] References Cited

U.S. PATENT DOCUMENTS

| | | | |
|---|---|---|---|
| 3,512,128 | 5/1970 | Maki | 340/963 |
| 3,538,760 | 11/1970 | Atkey et al. | 73/117.4 |
| 3,697,731 | 10/1972 | Kempema et al. | 364/431.01 |
| 3,736,796 | 6/1973 | Hohenberg | 73/178 T |
| 3,811,273 | 5/1974 | Martin | 60/224 |
| 3,852,958 | 12/1974 | Adams et al. | 340/966 |
| 3,867,717 | 2/1975 | Moehring et al. | 73/117.3 |
| 4,196,472 | 4/1980 | Ludwig et al. | 364/431 |
| 4,296,601 | 10/1981 | Martin | 60/224 |

FOREIGN PATENT DOCUMENTS 2079707 1/1982 United Kingdom ............ 340/966

Primary Examiner—James J. Groody
Assistant Examiner—Brent A. Swarthout
Attorney, Agent, or Firm—Donald J. Singer; Richard J. Donahue

[57] ABSTRACT

An asymmetric thrust warning system for an aircraft having two gas turbine engines. The compressor discharge pressures of the two engines are compared to determine the engine providing the lower thrust and to provide a signal indicative of the actual difference in thrust. If the difference in thrust exceeds a prescribed value related to aircraft altitude, a low thrust warning lamp is illuminated. In addition, the positions of the two augmenter metering valves are compared. If their positions significantly differ, the warning light associated with the valve having the minimum opening will be illuminated. A stall warning circuit may also be included as a part of the system.

6 Claims, 1 Drawing Figure

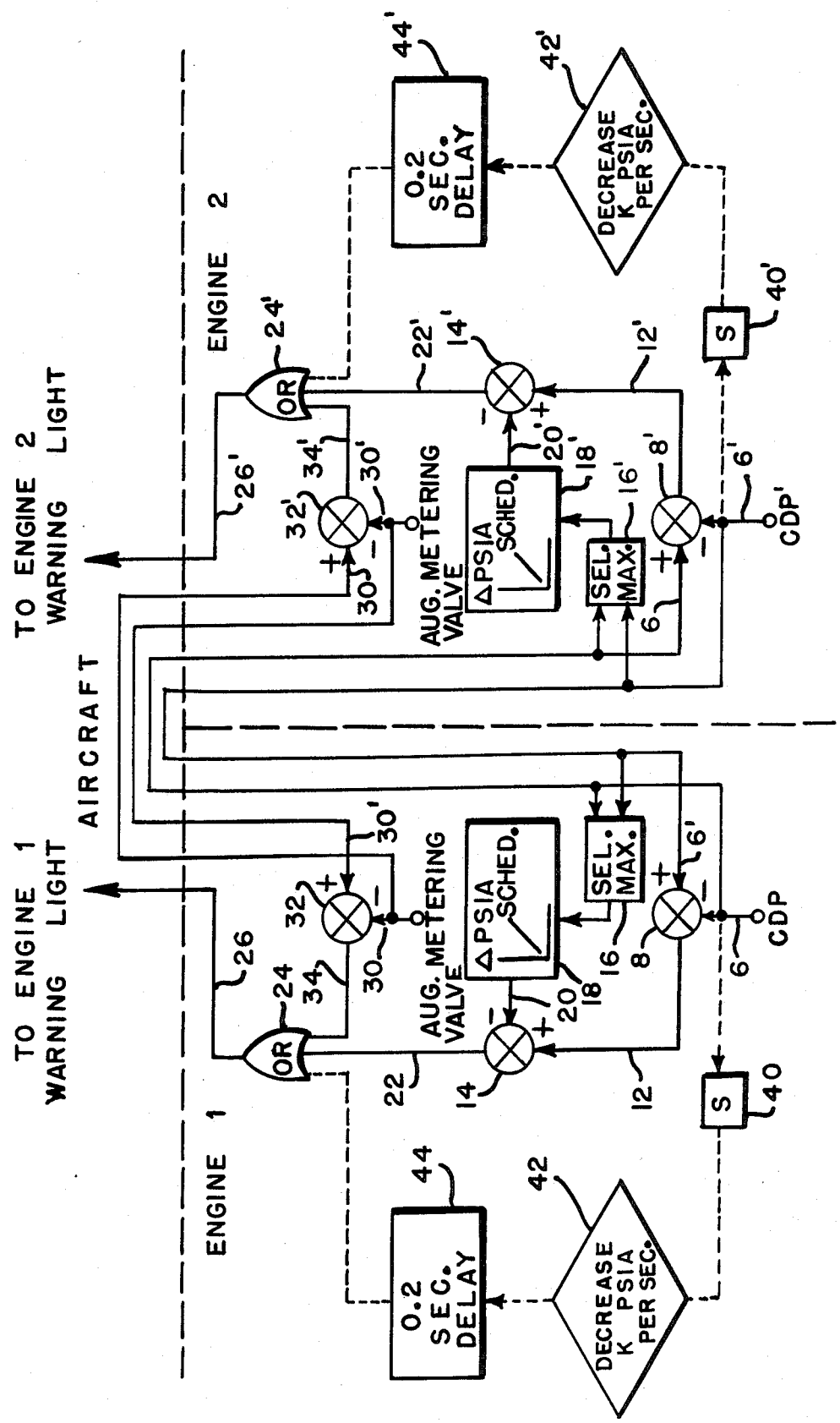

ASYMMETRIC THRUST WARNING SYSTEM FOR DUAL ENGINE AIRCRAFT

STATEMENT OF GOVERNMENT INTEREST

The invention described herein may be manufactured and used by or for the Government for governmental purposes without the payment of any royalty thereon.

BACKGROUND OF THE INVENTION

The present invention concerns a system for providing a warning indication of an asymmetric thrust condition in an aircraft having a pair of gas turbine engines.

Certain high speed two-engine jet aircraft, such as the Grumman F-14, have their engines mounted far enough apart to create aircraft control problems upon the sudden loss of thrust from one of the engines. Unless an early warning of such an asymmetric thrust condition is given to the pilot, especially during takeoff of the aircraft, corrective action may not be taken in time to avoid a disasterous situation.

It is therefore the principal object of the present invention to provide an asymmetric thrust warning system for a dual engine aircraft.

It is another object of the present invention to provide an asymmetric thrust warning system for a dual engine aircraft of the type having augmented engine thrust operation.

It is a further object hereof to provide an asymmetric thrust warning system having included therein an engine stall warning circuit.

SUMMARY OF THE INVENTION

There are two parameters on each gas turbine engine that are indicative of thrust. Compressor discharge pressure establishes a level of thrust during both dry and augmented operation. While compressor discharge pressure, alone, does not indicate augmented thrust level, a combination of compressor discharge pressure and the position of the augmenter control fuel metering valve does.

The asymmetric thrust warning system of this invention provides a means for comparing the compressor discharge pressure of one engine against that of the other engine to determine which of the engines has the lower compressor discharge pressure (sometimes referred to herein as CDP), and to determine the actual CDP difference between it and the other engine. The actual CDP difference is then compared to a predetermined schedule of allowable CDP difference. The allowable CDP difference value will vary in accordance with the altitude of the aircraft and if it is exceeded, a warning light associated with the engine having the lower CDP is illuminated.

The invention also includes means for comparing the relative positions of the augmenter metering valve and if the valve associated with only one engine should inadvertently close, then the warning light associated with its related engine will give an immediate warning of asymmetric thrust to the pilot.

If desired, an engine stall detection circuit can be included in the warning system. This circuitry senses a rate of change of decreasing CDP which exceeds a predetermined rate for a specified time.

These and other features, objects and advantages of the invention will become more apparent from the following detailed description of the preferred form thereof, illustrated in the accompanying drawing.

BRIEF DESCRIPTION OF THE DRAWING

The sole FIGURE of the drawing is a function block diagram illustrating the preferred form of the invention and showing an optional feature in dotted line form.

DESCRIPTION OF THE PREFERRED EMBODIMENT

The sole FIGURE of the drawing has been divided into two symmetrical areas containing warning circuitry related to engine 1 and to engine 2 of the aircraft respectively. A signal CDP indicative of the compressor discharge pressure of engine 1 is applied to the negative input of a summing circuit 8 and to the positive input of a summing circuit 8'. Similarly, a signal CDP' indicative of the compressor discharge pressure of engine 2 is applied to the negative input of summing circuit 8' and to the positive input of summing circuit 8. The compressor discharge pressures CDP and CDP' of engines 1 and 2 are thus compared by summing circuits 8 and 8'. If one of the engines, say engine 1 for example, has a significantly lower compressor discharge pressure than engine 2, a positive output signal will be formed on lead 12 and coupled to the positive input of summing circuit 14. Conversely, if engine 2 has a lower compressor discharge pressure than engine 1, a positive input signal will be formed on lead 12' and applied to the positive input of summing circuit 14'. In both instances, the positive signal on lead 12 or 12' will be related to the actual difference in the compressor discharge pressures CDP and CDP'.

Since a difference in compressor discharge pressure may be fairly high at sea level for asymmetric thrust and fairly low at altitude for asymmetric thrust, a schedule of allowable differential pressure versus actual differential compressor discharge pressure is included in the present invention and utilized in the manner discribed below.

Compressor discharge pressure signals CDP and CDP' from engines 1 and 2 are also applied to select maximum circuits 16 and 16' respectively. The select maximum circuits 16 and 16' assure the availability of the higher compressor discharge pressure at the inputs of the differential pressure schedule units 18 and 18'. The scheduled allowable difference in compressor discharge pressures, which as mentioned above is a function of aircraft altitudes, is compared to the actual difference by summing circuits 14 and 14'. If the actual difference in pressure signal on lead 12 is greater than the scheduled maximum allowable value on lead 20, a warning light signal is provided on output lead 22. This signal is applied to one input of OR gate 24. If, on the other hand, the actual difference in pressure signal on lead 12' is greater than the scheduled maximum allowable value on lead 20', a warning light signal is provided on output lead 22'. This signal is applied to one input of OR gate 24'. Thus, the engine with the lower pressure which exceeds an allowable pressure differential will provide an output from its associated OR gate, either OR gate 24 or 24', to illuminate the appropriate warning light in the aircraft.

The compressor discharge pressure signals are used for asymmetric thrust warning during both dry (unaugmented) and during augmented engine operation. During augmented operation, however, asymmetric thrust may also be caused by variances in the axial positions of the augmenter metering valves in addition to differences in compressor discharge pressure. Therefore, signals indicative of the augmenter metering valve positions of the two engines are provided at input leads 30 and 30' of comparator circuits 32 and 32' respectively.

If while at maximum augmented engine operation one augmenter fails, its metering valve will generally slew to the closed (minimum augmentation) position. One engine would then be at maximum augmentation and the other at minimum. The same thing might happen on a throttle burst to maximum power. One engine may light more rapidly than the other and one may be at maximum and the other at minimum because the engine control system will not release its metering valve unless a light is sensed. Comparators 32 and 32' will sense the difference in metering valve positions and the engine with the lower augmentation will signal an asymmetric thrust warning to the appropriate warning light. A signal is provided either by output lead 34 to OR gate 24 or by output lead 34' to OR gate 24'. OR gates 24 and 24' have output leads 26 and 26' which complete the ground side of their related warning lights that are placed in the aircraft cockpit.

Since compressor discharge pressures are a part of the asymmetric thrust warning system, it is not difficult to include an engine stall detector in the warning system. Such a stall detector circuit is shown by dashed lines in the drawing. Rate circuits 40 and 40' provide a signal that is proportional to the rate of change of compressor discharge pressure. Rate detector circuits 42 and 42' sense a rate decrease that exceeds some predetermined threshold (e.g., approximately 200 psi per second). If this threshold rate is exceeded for a time greater than 0.2 seconds, as timed by delay units 44 and 44', the appropriate warning light will be illuminated through OR gates 24 or 24'. In the event that both engines were to stall, both warning lights would be illuminated.

While preferred embodiments of the present invention have been depicted and described, there will be apparent to those skilled in the art that many modifications, substitutions and changes may be made thereto without departing from the true scope and spirit of the invention hereinafter claimed.

What is claimed is:

1. An asymmetric thrust warning system for aircraft having at least two augmentable gas turbine engines comprising:

first comparator means receiving a signal indicative of the compressor discharge pressure of a first one of said engines and receiving a signal indicative of the compressor discharge pressure of a second one of said engines;

said first comparator means determining which of said first or second engines has the lower compressor discharge pressure and providing an actual pressure difference signal;

second comparator means receiving said actual pressure difference signal from said first comparator means and receiving a maximum allowable pressure difference signal;

said second comparator means providing a first asymmetric thrust warning signal if the level of said actual pressure difference signal exceeds the level of said maximum allowable pressure difference signal;

third comparator means receiving a signal indicative of the position of the augmenter metering valve of said first engine and a signal indicative of the position of the augmenter metering valve of said second engine;

said third comparator means providing a second asymmetric thrust warning signal when the augmenter metering valve of said first engine and the augmenter metering valve of said second engine are in different operating positions;

thrust warning means; and gate means for coupling said first and second thrust warning signals to said thrust warning means.

2. Apparatus as defined in claim 1 wherein the level of said maximum allowable pressure difference signal varies in accordance with the altitude of said aircraft.

3. Apparatus as defined in claim 2 wherein said first, second and third comparator means are each signal summing circuits.

4. Apparatus as defined in claim 3 wherein said thrust warning means comprises an indicator lamp positioned within the cockpit of said aircraft.

5. Apparatus as defined in claim 4 and further comprising:

means for determining the rate of change of compressor discharge pressure of said first engine and of said second engine;

means for providing a stall warning signal if the compressor discharge pressure of said first engine or of said second engine decreases at a rate greater than a predetermined rate for a time exceeding a maximum time; and means for coupling said stall warning signal to said gate means.

6. Apparatus as defined in claim 5 wherein said predetermined rate is 200 psia per second and said maximum time is 0.2 seconds.

* * * * *